United States Patent
Yang et al.

(10) Patent No.: US 12,008,467 B2
(45) Date of Patent: Jun. 11, 2024

(54) ASYMMETRIC QUANTIZATION FOR COMPRESSION AND FOR ACCELERATION OF INFERENCE FOR NEURAL NETWORKS

(71) Applicant: Baidu USA, LLC, Sunnyvale, CA (US)

(72) Inventors: Yingzhen Yang, Santa Clara, CA (US); Zhibiao Zhao, Cupertino, CA (US); Baoxin Zhao, Beijing (CN); Jun Huan, Beijing (CN); Jian Ouyang, Beijing (CN); Yong Wang, Shanghai (CN); Jiaxin Shi, Shanghai (CN)

(73) Assignee: Baidu USA LLC, Sunnyvale, CA (US)

( * ) Notice: Subject to any disclaimer, the term of this patent is extended or adjusted under 35 U.S.C. 154(b) by 398 days.

(21) Appl. No.: 16/877,582

(22) Filed: May 19, 2020

(65) Prior Publication Data

US 2021/0004679 A1    Jan. 7, 2021

Related U.S. Application Data

(60) Provisional application No. 62/869,560, filed on Jul. 1, 2019.

(51) Int. Cl.
*G06N 3/08* (2023.01)
*G06N 3/04* (2023.01)

(52) U.S. Cl.
CPC .............. *G06N 3/08* (2013.01); *G06N 3/04* (2013.01)

(58) Field of Classification Search
None
See application file for complete search history.

(56) References Cited

U.S. PATENT DOCUMENTS

| 5,293,456 A | 3/1994 | Guez et al. | |
|---|---|---|---|
| 7,783,440 B1 * | 8/2010 | Lewis | H04N 17/002 702/77 |
| 2007/0268377 A1 * | 11/2007 | Nagano | H04N 23/125 348/222.1 |

(Continued)

FOREIGN PATENT DOCUMENTS

| CN | 105637540 A | 6/2016 |
|---|---|---|
| CN | 107944556 A | 4/2018 |

OTHER PUBLICATIONS

Tucker et al., "Some mathematical notes on three-mode factor analysis," Psychometrika, vol. 31(3), pp. 279-311, 1966. (3pgs).

(Continued)

*Primary Examiner* — Aaron M Richer
(74) *Attorney, Agent, or Firm* — NORTH WEBER & BAUGH LLP

(57) ABSTRACT

Presented herein are embodiments of an improved asymmetric quantization, which may generally be referred to as improved asymmetric quantization (IAQ) embodiments. IAQ embodiments combine the benefits of conventional asymmetric quantization and symmetric quantization but also provide additional computation efficiencies. Embodiments of IAQ adopt an asymmetric range of the weights of a neural network layer, so they circumvent the limitation of symmetric range of symmetric quantization. Moreover, the inference process of a neural network quantized by an IAQ embodiment is much faster than that of the neural network quantized by conventional asymmetric quantization by quantizing an offset value of each layer.

20 Claims, 6 Drawing Sheets

(56) References Cited

U.S. PATENT DOCUMENTS

| | | | |
|---|---|---|---|
| 2019/0180144 A1 | 6/2019 | Tsishkou et al. | |
| 2019/0294413 A1* | 9/2019 | Vantrease | G06N 3/063 |
| 2020/0242473 A1* | 7/2020 | de Vangel | G06N 3/04 |

OTHER PUBLICATIONS

I. Oseledets, "Tensor-train decomposition," SIAM Journal on Scientific Computing, vol. 33, No. 5, pp. 2295-2317, 2011. (24 pgs).

Zhao et al., "Tensor Ring Decomposition," arXiv preprint arXiv:1606.05535, 2016. (14 pgs).

Mickelin et al., "On Algorithms for and Computing with the Tensor Ring Decomposition," arXiv preprint arXiv:1807.02513, 2020. (24pgs).

Chen et al., "Tensor Ring Decomposition: Energy Landscape and One-loop Convergence of Alternating Least Squares," arXiv preprint arXiv:1905.07101, 2020. (26pgs).

Yuan et al., "Randomized tensor ring decomposition and its application to largescale data reconstruction," arXiv preprint arXiv:1901.01652, 2019. (5pgs).

Lebedev et al., "Speeding-up Convolutional Neural Networks Using Fine-tuned CPDecomposition," arXiv preprint arXiv:1412.6553, 2015. (11pgs).

Kim et al., "Compression of Deep Convolutional Neural Networks for Fast and Low Power Mobile Applications," arXiv preprint arXiv:1511.06530, 2016. (16pgs).

Novikov et al., "Tensorizing Neural Networks," arXiv preprint arXiv:1509.06569, 2015. (9 pgs).

Garipov et al., "Ultimate tensorization:compressing convolutional and FC layers alike," arXiv preprint arXiv:1611.03214, 2016. (6pgs).

The Extended European Search Report, dated Dec. 7, 2020, in European Patent Application No. 20 18 0519, dated Dec. 18, 2020. (8 pgs).

R. Krishnamoorthi, "Quantizing deep convolutional networks for efficient inference: A whitepaper," arXiv preprint arXiv:1806.08342, 2018. (36 pgs).

Benoit et al., "Quantization and Training of Neural Networks for Efficient Integer-Arithmetic-Only Inference," arXiv preprint arXiv:1712.05877, 2017. (14pgs).

Tamara et al., "Tensor Decompositions and Applications," SIAM Rev., vol. 51, No. 3, pp. 455-500, Aug. 2009. (46pgs).

Cichocki et al., "Low-RankTensor Networks for Dimensionality Reduction and Large-Scale Optimization Problems: Perspectives and Challenges PART 1," arXiv preprint arXiv:1609.00893, 2017. (176pgs).

Cichocki et al., "Tensor Networks for Dimensionality Reduction and Large-Scale Optimizations Part 2 Applications and Future Perspectives," ArXiv preprint arXiv:1708.09165, 2017. (232pgs).

Sidiropoulos et al., "Tensor decomposition for signal processing and machine learning," IEEE Transactions on Signal Processing, vol. 65, No. 13, pp. 3551-3582, 2017. (32pgs).

Ba et al., "Do deep nets really need to be deep?," arXiv preprint arXiv:1312.6184, 2014. (10pgs).

Denton et al., "Exploiting linear structure within convolutional networks for efficient evaluation," arXiv preprint arXiv:1404.0736, 2014. (11pgs).

Han et al., "Deep Compression: Compressing Deep Neural Networks with Pruning, Trained Quantization and Huffman Coding," arXiv preprint arXiv:1510.00149, 2016. (14pgs).

He et al., "AMC: AutoML for model compression and acceleration on mobile devices," arXiv preprint arXiv:1802.03494, 2019. (17pgs).

Wang et al., "Wide Compression: Tensor Ring Nets," arXiv preprint arXiv:1802.09052, 2018. (12pgs).

Hayashi et al., "Einconv: Exploring Unexplored Tensor Decompositions for Convolutional Neural Networks," arXiv preprint arXiv:1908.04471, 2019. (12pgs).

Zhong et al., "ADA-Tucker: Compressing deep neural networks via adaptive dimension adjustment tucker decomposition," arXiv preprint arXiv:1906.07671, 2019. (25pgs).

Sutton et al., "Introduction to Reinforcement Learning," MIT Press, Cambridge, MA, USA, 1st edition, 2015. (352pgs).

Lillicrap et al., "Continuous control with deep reinforcement learning," arXiv preprint arXiv:1509.02971, 2019. (14pgs).

Mnih et al., "Playing Atari with Deep Reinforcement Learning," arXiv preprint arXiv:1312.5602, 2013. (9pgs).

V. Konda, "Actor-critic Algorithms," Ph.D. thesis, Cambridge, MA, USA, 2002, AAI0804543. (147pgs).

* cited by examiner

100

Asymmetric Quantization

105
A quantized layer

110
Inference with the quantized layer 115
(integer operation)

200

205
A quantized layer

210
Inference with the quantized layer 215
(integer operation)

500

505
Two quantized layers

510
Inference with the two quantized layers 515
(integer operation)

ASYMMETRIC QUANTIZATION FOR COMPRESSION AND FOR ACCELERATION OF INFERENCE FOR NEURAL NETWORKS

CROSS-REFERENCE TO RELATED APPLICATION

This application claims the priority benefit under 35 USC § 119(e) to U.S. Prov. Pat. App. Ser. No. 62/869,560, filed on 1 Jul. 2019, entitled "IMPROVED ASYMMETRIC QUANTIZATION FOR COMPRESSION AND ACCELERATION OF INFERENCE FOR NEURAL NETWORKS," and listing Yingzhen Yang, Zhibiao Zhao, Baoxin Zhao, Jun Huan, Jian Ouyang, Yong Wang, and Jiaxin Shi, as inventors. The aforementioned patent document is incorporated by reference herein in its entirety.

BACKGROUND

A. Technical Field

The present disclosure relates generally to systems and methods for computer learning that can provide improved computer performance, features, and uses. More particularly, the present disclosure relates to embodiments of improved compressing and of improved accelerated inference of neural networks.

B. Background

Deep Neural Networks (DNNs) achieved stunning success in artificial intelligence. However, the model size of DNNs is usually very large. Weight quantization is an important method for compression of DNNs by using low-bit representation for each floating weight of DNNs. The traditional symmetric quantization assumes that the range of the weights is symmetric with respect to zero. This assumption often does not hold in practice. Therefore, asymmetric quantization has been widely used to circumvent the drawback of symmetric quantization. However, conventional asymmetric quantization results in delay in the inference process of the quantized DNNs, in part, because of the added computations and because of the types of computations.

Accordingly, what is needed are systems and methods that provide improved asymmetric quantization that provides compression, which helps reduce the memory and processing requirements, improved acceleration of neural networks by reducing the computation load due to the quantization, or both.

BRIEF DESCRIPTION OF THE DRAWINGS

References will be made to embodiments of the disclosure, examples of which may be illustrated in the accompanying figures. These figures are intended to be illustrative, not limiting. Although the disclosure is generally described in the context of these embodiments, it should be understood that it is not intended to limit the scope of the disclosure to these particular embodiments. Items in the figures may not be to scale.

Figure ("FIG.") 1 depicts an illustration of a layer of a Deep Neural Network (DNN) quantized by conventional asymmetric quantization.

DETAILED DESCRIPTION OF EMBODIMENTS

Figure 1:
Figure 1:
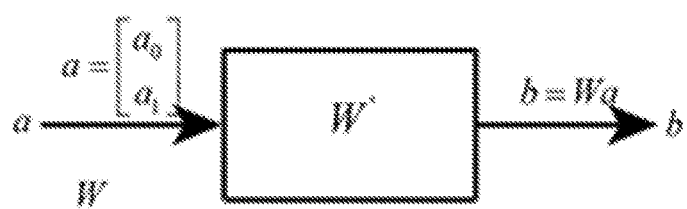

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system/device, or a method on a tangible computer-readable medium.

Components, or modules, shown in diagrams are illustrative of exemplary embodiments of the disclosure and are meant to avoid obscuring the disclosure. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," "communicatively coupled," "interfacing," "interface," or any of their derivatives shall be understood to include direct connections, indirect connections through one or more intermediary devices, and wireless connections. It shall also be noted that any communication, such as a signal, response, reply, acknowledgement, message, query, etc., may comprise one or more exchanges of information.

Reference in the specification to "one embodiment," "preferred embodiment," "an embodiment," or "embodiments" means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. The terms "include," "including," "comprise," and "comprising" shall be understood to be open terms and any lists that follow are examples and not meant to be limited to the listed items. A "layer" may comprise one or more operations. The words "optimal," "optimize," "optimization," and the like refer to an improvement of an outcome or a process and do not require that the specified outcome or process has achieved an "optimal" or peak state.

A service, function, or resource is not limited to a single service, function, or resource; usage of these terms may refer to a grouping of related services, functions, or resources, which may be distributed or aggregated. The use of memory, database, information base, data store, tables, hardware, cache, and the like may be used herein to refer to system component or components into which information may be entered or otherwise recorded. The terms "data," "information," along with similar terms may be replaced by other terminologies referring to a group of bits and may be used interchangeably. In one or more embodiments, a stop condition may include: (1) a set number of iterations have been performed; (2) an amount of processing time has been reached; (3) convergence (e.g., the difference between consecutive iterations is less than a first threshold value); (4) divergence (e.g., the performance deteriorates); and (5) an acceptable outcome has been reached.

Any headings used herein are for organizational purposes only and shall not be used to limit the scope of the description or the claims. Each reference mentioned in this patent document is incorporate by reference herein in its entirety.

It shall be noted that: (1) certain steps may optionally be performed; (2) steps may not be limited to the specific order set forth herein; (3) certain steps may be performed in different orders; and (4) certain steps may be done concurrently.

It shall be noted that any experiments and results provided herein are provided by way of illustration and were performed under specific conditions using a specific embodiment or embodiments; accordingly, neither these experiments nor their results shall be used to limit the scope of the disclosure of the current patent document.

A. Introduction

As noted above, conventional asymmetric quantization tends to result in delays in the inference process of a quantized neural networks. Accordingly, presented herein are embodiments of improved asymmetric quantization, which embodiments may, for convenience, be referred to generally as improved asymmetric quantization (IAQ) embodiments. IAQ embodiments employ implementations of asymmetric quantization but the delay during the inference process is significantly reduced as compared to the conventional asymmetric quantization.

Quantization methods have been used to reduce the model size of neural networks (NNs). Quantization methods represent each floating weight of a neural network by a low-bit representation, so the quantized NN has reduced model size. For example, one can represent each 32-bit floating-point weight of a NN by an 8-bit byte, so that the total number of bits required to store the NN is reduced by four times.

Based on how the floating-point value is mapped to a low-bit representation, quantization methods may typically be categorized into two classes, i.e. asymmetric quantization and symmetric quantization, which are discussed in more detail below.

1. Asymmetric Quantization

A layer of a neural network comprises a plurality of weights, in which at least one weight will have a minimum value and at least one weight will have a maximum value. The minimum and maximum values of the weights of a layer of a neural network may be denoted by min and max, respectively. If the target low-bit representation has n bits, a scale factor for quantization may be computed as $$s = \frac{(\max - \min)}{2^{n-1}},$$

where n is the number of bits of the low-bit representation. Each floating-point weight w may be quantized as $$w_q = \text{round}\left(\frac{w - \min}{s}\right),$$

where round is a rounding function that rounds its input to the closest integer. $w_q$ is the low-bit representation for the original weight w after asymmetric quantization.

While asymmetric quantization covers the range, which can be asymmetric with respect to zero, the floating-point weight recovered from the quantized weight is expressed as $\min + w_q * s$. While the part $w_q * s$ may be handled in an efficient way, the addition of min and $w_q * s$ constitutes a floating-point operation since min is a floating-point number. Therefore, the dequantization, i.e., the process of converting a quantized weight to a floating-point weight, is computationally inefficient. Given that a neural network may have vast numbers of weights, each requiring this inefficient computation, the computation resources (e.g., computation time and energy) are inefficiently utilized, causing added delay, added computation, and added energy consumption.

2. Symmetric Quantization

In contrast with asymmetric quantization, where the range [min, max] is mapped to the quantized range, symmetric quantization maps the range [−mmax, mmax] to the quantized range where mmax represents the maximum value of |min| and |max| and | | indicates the operator that returns the absolute value of the input. Therefore, symmetric quantization quantizes a range that is symmetric with respect to zero.

The scale factor for quantization may be computed as $$s = \frac{2mmax}{2^{n-1}}.$$

Each floating-point weight w may be quantized as $$w_q = \text{round}\left(\frac{w + mmax}{s}\right),$$

and the floating-point weight recovered from the quantized $$\text{weight is } -mmax + w_q * s = \frac{2mmax}{2^{n-1}} * (-2^{n-1} + w_q).$$

Since $(-2^{n-1}+w_q)$ is a low-bit integer, e.g., it is of type int8 when n=8, the recovered floating-point weight can be more efficiently computed.

However, if the range of the weights are biased towards one side of zero, symmetric quantization results in a quantized range where half of the whole range is dedicated to values that will never be observed. The most extreme example is the case wherein all the floating-point weights are positive. Quantizing such weights in symmetric mode results in a loss of at least one bit, which is a major drawback of symmetric quantization.

B. Improved Asymmetric Quantization (IAQ) Embodiments

Improved Asymmetric Quantization (IAQ) embodiments combine the best of conventional asymmetric quantization and symmetric quantization and avoids their drawbacks. IAQ embodiments adopt asymmetric range of the weights, so they circumvent the limitations of symmetric range of symmetric quantization. Moreover, the inference process of a neural network quantized by IAQ embodiments are much faster than that of a neural network quantized by conventional asymmetric quantization by quantizing the minimum or maximum value of each layer.

FIG. 1 depicts an illustration of a layer of a neural network quantized by conventional asymmetric quantization. The left part 105 of FIG. 1 shows a layer of a neural network quantized by conventional asymmetric quantization, and its right part 110 illustrates the operation of this layer in the inference process. Here m is the minimum value of the weights of this layer, and s is the scale factor for quantization, W is the quantized matrix for the linear operation performed in this layer. By way of illustration and not limitation, assume W is a 2×2 matrix and $i_0$, $i_1$, $i_2$, and $i_3$ are the four quantized weights of W.

By choosing different values for the number of bits in the low-bit representation for quantization, the quantized weights require much less storage than the original floating-point weights. In one or more embodiments, an 8-bit representation is adopted, which makes each quantized weight a byte or of type int8. Each quantized weight occupies only one fourth of the storage required by a 32-bit floating-point number. It shall be noted, however, different bit representation other than 8-bit may be used.

In one or more embodiments, in the inference process, W' indicates the floating-point weights recovered from W, a is the input to this layer, and b is the output of this layer. In one or more embodiments, the input a is quantized so that each element of a is a byte or of type int8. The expression of b=W'a can be seen in FIG. 1, which is comprised of two terms. The term in box 115 involves only integer operations (with a scaling by s), which can be computed efficiently in a programmable logic device (i.e., a hardware implementation), such as an application specific integrated circuit, like an artificial-intelligence microchip/microprocessor. However, the first part has an operation of multiplication by the floating-point number m, and one has to add the two terms by floating-point addition to obtain the output b. Therefore, the overall computation of b cannot benefit from the fast integer operation. IAQ embodiments overcome the issues of inference speed for neural networks.

Figure 2:
FIG. 2 depicts an illustration of a layer of a neural network quantized by improved asymmetric quantization (IAQ), according to embodiments of the present disclosure.
Figure 2:
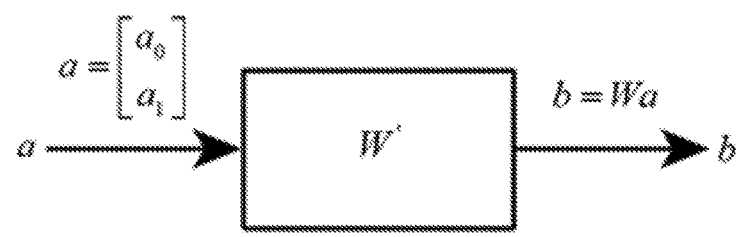

FIG. 2 depicts an illustration of a layer of a DNN quantized by an improved asymmetric quantization embodiment. The same layer as that shown in FIG. 1 is quantized by an IAQ embodiment in FIG. 2. The left part 205 of FIG. 2 shows the layer quantized by the IAQ embodiment, and each quantized weight is a byte or of type int8. The right part 210 of FIG. 2 shows an inference process of this layer.

Comparing to the conventional asymmetric quantization, one of the innovative aspects of IAQ is to quantize the minimum or maximum value of the weights of the original layer. As shown in FIG. 2, the depicted IAQ embodiment computes $$m_0 = \text{round}\left(\frac{m}{s}\right),$$

and then uses $m_0 * s$ as an approximation to the original m. The quantization of m in this way leads to a new expression of the output b shown in FIG. 2, where b is the result of the product of the scale factor s and another result of an integer operation marked with box 215. The integer operation outlined by box 215 can be efficiently computed on chips, and the multiplication involving s may be handled separately. Due to the fast computation for integer operation on chips, the inference process of a DNN quantized by an IAQ embodiment is much faster than that by conventional asymmetric quantization.

Figure 3:
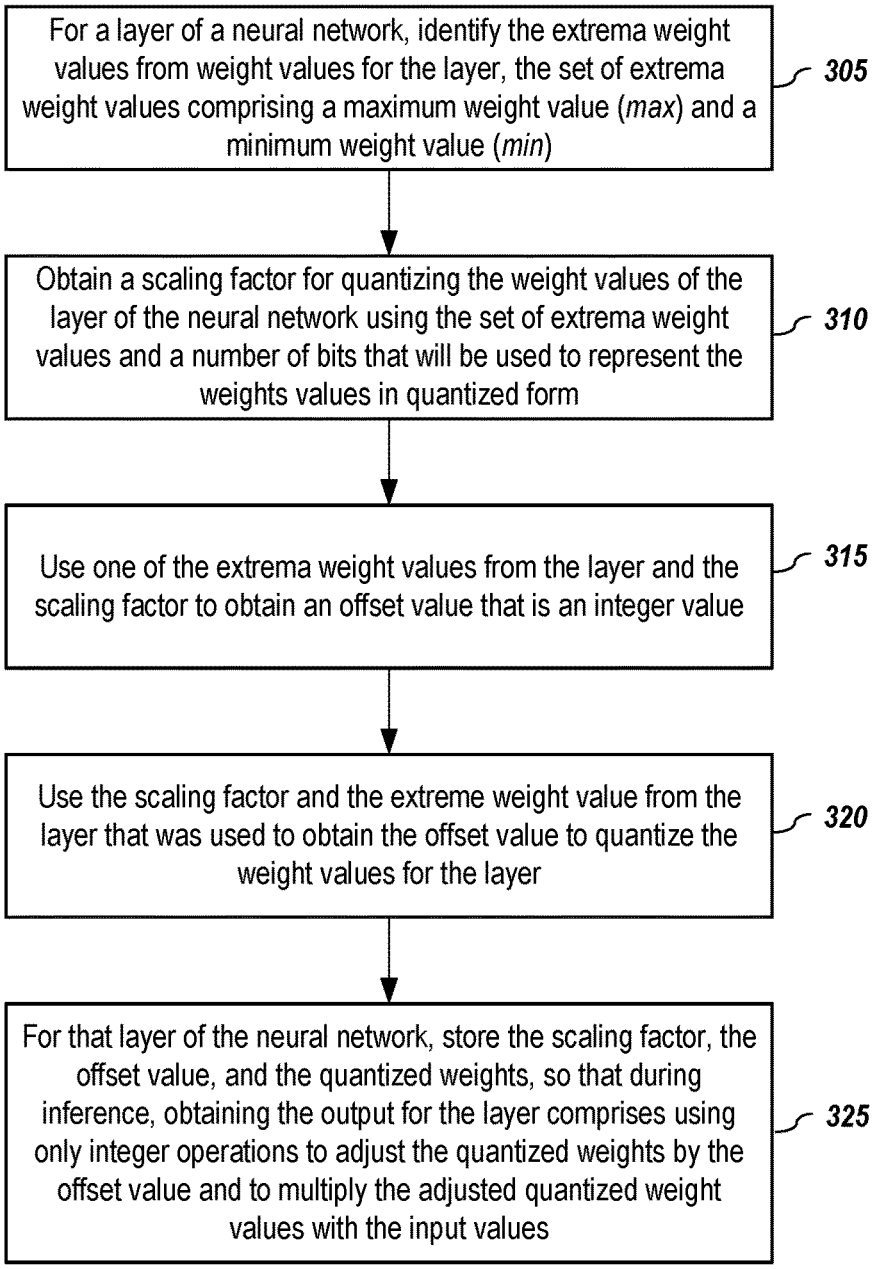
FIG. 3 depicts a method for improved asymmetric quantization (IAQ), according to embodiments of the present disclosure.

FIG. 3 depicts a method for improved asymmetric quantization (IAQ), according to embodiments of the present disclosure. In one or more embodiments, for a layer of a neural network, the extrema weight values from the weight values for the layer are identified (305). The set of extrema weight values comprises the maximum weight value (max) from the weight values for the layer and the minimum weight value (min) from the weight values for the layer.

In one or more embodiments, given the extrema values, a scaling factor for quantizing the weight values of the layer of the neural network may be obtained (310) using the set of extrema weight values and a number of bits (n) that will be used to represent the weights values in quantized form. In one or more embodiments, the scaling factor (s) may be computed as follows:

$$s = \frac{(\max - \min)}{2^{n-1}}$$

Given the scaling factor for the layer and one of the extrema weight values from the layer, an offset value may be computed (315). In one or more embodiments, the extreme value may be either the min value or the max value; however, as will be shown below, the selection affects how the dequantization is performed.

If the min value is selected, the offset may be computed as:

$$m_0 = \text{round}\left(\frac{\min}{s}\right)$$

If the max value is selected, the offset may be computed as:

$$m_0 = \text{round}\left(\frac{\max}{s}\right)$$

As indicated above, regardless of the embodiments, the offset value is set as an integer value so that during inference, integer operations, which a faster to perform, may be utilized more extensively. In one or more embodiments, a rounding operation may be used to obtain the integer offset value, $m_0$. However, it shall be noted that other mechanism may be used including truncation or other conversions that result in the offset being an integer value.

In one or more embodiments, the selected extreme weight value for the layer that was used to obtain the offset value and the scaling factor are used (320) to obtain the quantized weight values for the layer. If the min value was used for obtaining the offset value, in one or more embodiments, a weight value, w, may be quantized as follows:

$$i = \text{round}\left(\frac{w - \min}{s}\right)$$

And, if the max value was used for obtaining the offset value, in one or more embodiments, a weight value, w, may be quantized as follows:

$$i = \text{round}\left(\frac{\max - w}{s}\right)$$

It shall be noted that steps 315 and 320 may readily be done in a different order or done concurrently. It shall be noted that while rounding is noted above, other mechanism may be used including truncation or other conversions that result in the quantized weight values being integer values.

In one or more embodiments, for that layer of the neural network, the scaling factor, the offset value, and the quantized weights are stored (325). Thus, during inference, obtaining the output for the layer comprises using only integer operations to adjust the quantized weights by the offset value and to multiply the adjusted quantized weight values with the input values. Since these are integer operations only, they can be performed efficiently. In one or more embodiments, an indicator may also be stored to indicate whether the offset value was determined from the min value or the max value. In one or more embodiments, a default may be set (e.g., min value is used or max value is used) so that no indicator is needed. In yet another embodiment, a default may be used and an indicator is used only if the selected extreme value is different from the default.

One skilled in the art shall recognize that embodiments of IAC provide several technical advantages. First, the quantization allows for compression of the weights. Compression provides a number of advantages, such as less storage requirements and potentially fewer memory reads as the quantized values are more likely to fit within processing memory/cache. Second, by configuring the quantization according to the IAC, during inference, more operations may be performed using integer operations, which are faster to perform in hardware.

Figure 4:
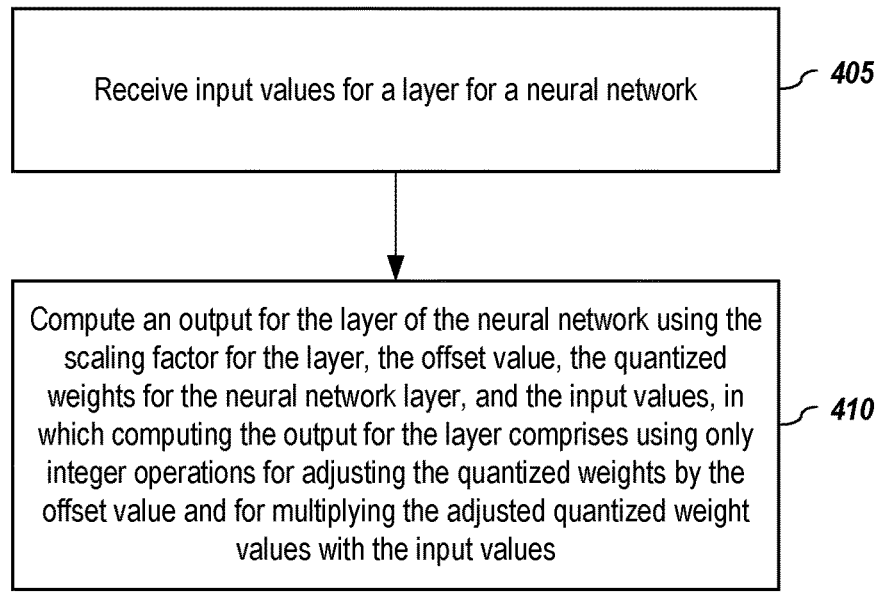
FIG. 4 provides a methodology for inference using weights that have been quantized using an IAC embodiment.

FIG. 4 provides a methodology for inference using weights that have been quantized using an IAC embodiment. In one or more embodiments, input values for the layer of the neural network are received (405), which are typically a vector of integers. In one or more embodiments, an output for that layer of the neural network may be computed (410) using the scaling factor for the layer, the offset value, the quantized weights for the layer, and the input values.

Assume for sake of illustration that a layer's weight matrix (W) is a 2×2 matrix with quantized weight values:

$$W = \begin{bmatrix} i_0 & i_1 \\ i_2 & i_3 \end{bmatrix}$$

In one or more embodiments in which the offset value, $m_o$, was based upon the min value, the output, b, may be computed as:

$$b = W'a \approx s \begin{bmatrix} m_o + i_0 & m_o + i_1 \\ m_o + i_2 & m_o + i_3 \end{bmatrix} a$$

In one or more embodiments in which the offset value, $m_o$, was based upon the max value, the output, b, may be computed as:

$$b = W'a \approx s \begin{bmatrix} m_o - i_0 & m_o - i_1 \\ m_o - i_2 & m_o - i_3 \end{bmatrix} a$$

Regardless of the min or max embodiment, the computing the output, b, involves using only integer operations to adjust the quantized weights by the offset value, $m_o$, and to multiply the adjusted quantized weight values with the input values, a.

Figure 5:
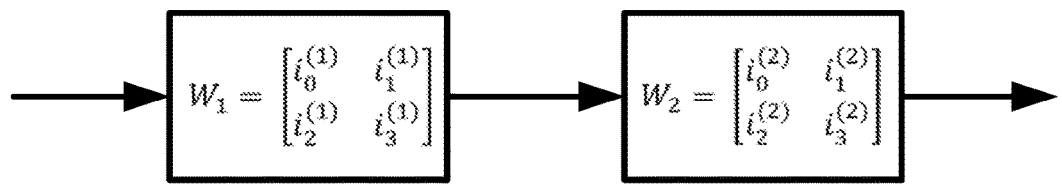
FIG. 5 depicts an illustration of multiple layers of a neural network quantized by improved asymmetric quantization (IAQ), according to embodiments of the present disclosure.
Figure 5:
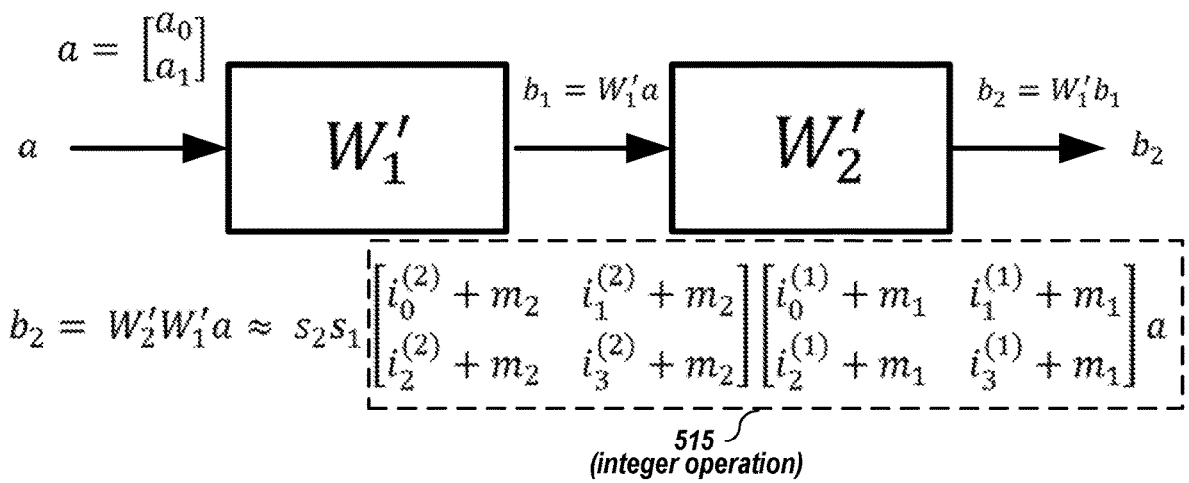

It shall be noted that embodiments of IAQ improve inference speed with multiple layers. To further illustrate how IAQ embodiments improve the inference speed of a neural network with multiple layers, a case involving the quantization of two layers in a neural network by IAQ is presented herein. FIG. 5 depicts an illustration of two layers of a neural network quantized by an IAQ embodiment. The upper part 505 of FIG. 5 shows two quantized layers, wherein both layers perform linear operation represented by matrices $W_1$ and $W_2$, and in the depicted example, each quantized weight of $W_1$ and $W_2$ may be a byte or of type int8. The bottom part 510 of FIG. 5 illustrates an inference process of these two layers. $s_1$ and $s_2$ are the scale factors for quantization of these two layers respectively, and $m_1$ and $m_2$ are the quantized minimum values of these two layers. According to an quantization IAQ embodiment presented above, the output of these two layers, denoted by $b_2 = W'_2 W'_1 a$, may be expressed as the product of $s_2 * s_1$ and the result of an integer operation marked by box 515. In the depicted embodiments, the integer operation involves multiplication of two integer matrices; and in the general case of a neural network with L consecutive layers, the product of L integer matrix is computed.

As with the other embodiments, the integer operation may be efficiently performed, particularly on chips. In one or more embodiments, the overall inference process for these consecutive layers quantized by an IAQ embodiment may be divided into two efficient steps: (1) computing the result of the integer operation marked by box 515, which may be referred to for convenience as an intermediate product; and (2) scaling the intermediate product of step (1) by the product of the scaling factors, $s_2 * s_1$. While step (2) involves multiplication with the floating-point number $s_1$ and $s_2$, such multiplication is only performed for each element of the result of step (1), which is far fewer non-integer operations than without any quantization or with traditional quantization. Compared to the inference process of neural networks quantized by conventional asymmetric quantization where multiplication of floating-point matrices is performed, the inference process of a neural network quantized by an IAQ embodiment is much more efficient and as a result much faster.

C. Computing System Embodiments

In one or more embodiments, aspects of the present patent document may be directed to, may include, or may be implemented on one or more information handling systems/computing systems. A computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, phablet, personal digital assistant (PDA), smart phone, smart watch, smart package, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, read only memory (ROM), and/or other types of memory. Additional components of the computing system may include one or more disk drives, one or more network ports for communicating with external devices as well as various input and output (I/O) devices, such as a keyboard, a mouse, stylus, touchscreen and/or a video display. The computing system may also include one or more buses operable to transmit communications between the various hardware components.

Figure 6:
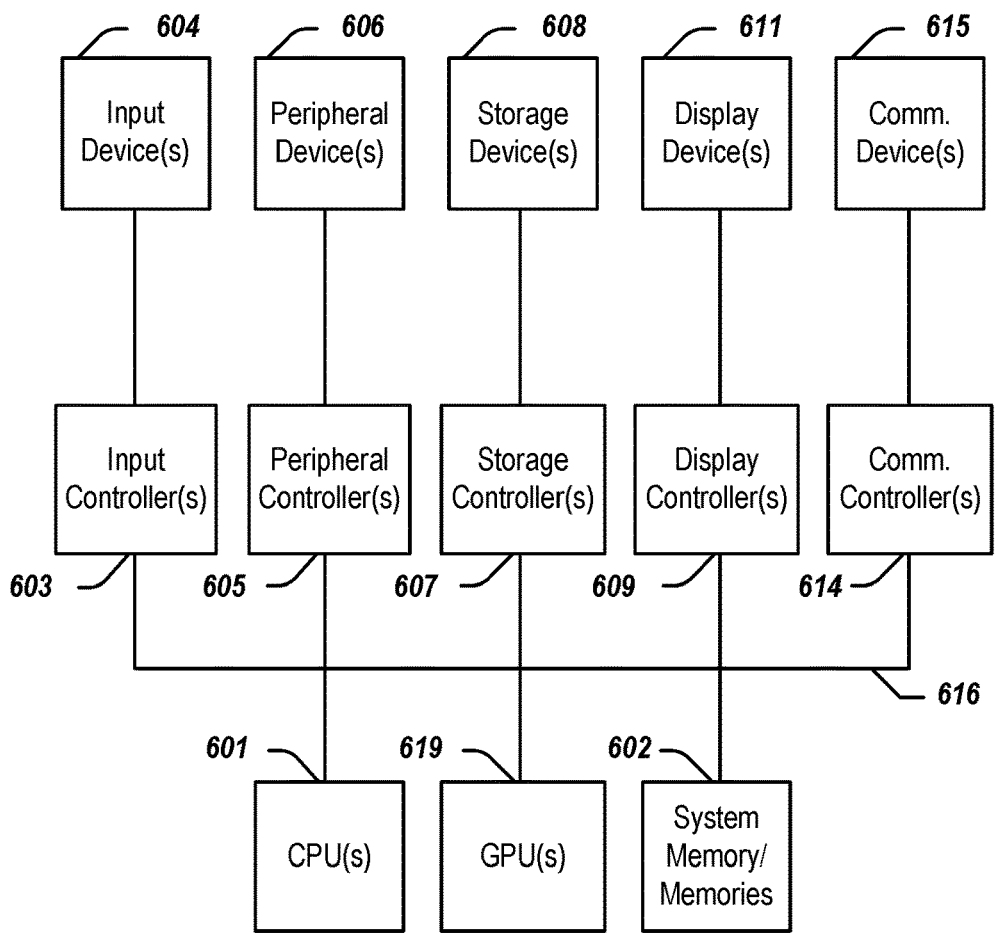
FIG. 6 depicts a simplified block diagram of a computing device/information handling system, in accordance with embodiments of the present document.

FIG. 6 depicts a simplified block diagram of a computing device/information handling system (or computing system), according to embodiments of the present disclosure. It will be understood that the functionalities shown for system 600 may operate to support various embodiments of a computing system—although it shall be understood that a computing system may be differently configured and include different components, including having fewer or more components as depicted in FIG. 6.

As illustrated in FIG. 6, the computing system 600 includes one or more central processing units (CPU) 601 that provides computing resources and controls the computer. CPU 601 may be implemented with a microprocessor or the like, and may also include one or more graphics processing units (GPU) 619 and/or a floating-point coprocessor for mathematical computations. In one or more embodiments, one or more GPUs 619 may be incorporated within the display controller 609, such as part of a graphics card or cards. The system 600 may also include a system memory 602, which may comprise RAM, ROM, or both.

A number of controllers and peripheral devices may also be provided, as shown in FIG. 6. An input controller 603 represents an interface to various input device(s) 604, such as a keyboard, mouse, touchscreen, and/or stylus. The computing system 600 may also include a storage controller 607 for interfacing with one or more storage devices 608 each of which includes a storage medium such as magnetic tape or disk, or an optical medium that might be used to record programs of instructions for operating systems, utilities, and applications, which may include embodiments of programs that implement various aspects of the present disclosure. Storage device(s) 608 may also be used to store processed data or data to be processed in accordance with the disclosure. The system 600 may also include a display controller 609 for providing an interface to a display device 611, which may be a cathode ray tube (CRT), a thin film transistor (TFT) display, organic light-emitting diode, electroluminescent panel, plasma panel, or other type of display. The computing system 600 may also include one or more peripheral controllers or interfaces 605 for one or more peripherals 606. Examples of peripherals may include one or more printers, scanners, input devices, output devices, sensors, and the like. A communications controller 614 may interface with one or more communication devices 615, which enables the system 600 to connect to remote devices through any of a variety of networks including the Internet, a cloud resource (e.g., an Ethernet cloud, a Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals.

In the illustrated system, all major system components may connect to a bus 616, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable medium including, for example: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

Aspects of the present disclosure may be encoded upon one or more non-transitory computer-readable media with instructions for one or more processors or processing units to cause steps to be performed. It shall be noted that the one or more non-transitory computer-readable media shall include volatile and/or non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts. Examples of tangible computer-readable media include, for example: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter.

Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

It shall be noted that embodiments of the present disclosure may further relate computer microchips or chips in which the functionality described herein may be implemented in hardware and/or firmware of one or more chips.

One skilled in the art will recognize no computing system or programming language is critical to the practice of the present disclosure. One skilled in the art will also recognize that a number of the elements described above may be physically and/or functionally separated into modules and/or sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A computer-implemented method for asymmetric quantization of at least some weight values of a neural network, the method comprising:
   identifying a set of extrema weight values from weight values for a layer of the neural network, the set of extrema weight values comprising a maximum weight value and a minimum weight value;
   obtaining a scaling factor for quantizing the weight values of the layer of the neural network using the set of extrema weight values and a number of bits that will be used to represent the weight values in quantized form;
   using one of the extrema weight values and the scaling factor to obtain an offset value for the layer by performing steps comprising:
      dividing the extreme weight value by the scaling factor to obtain a quotient; and
      converting the quotient to an integer value;
   using the scaling factor and the extreme weight value from the set of extrema weight values that was used to obtain the offset value to quantize the weight values for the layer; and
   for the layer, storing the scaling factor, the offset value, and the quantized weight values, to be used during inference, in which obtaining an output for the layer comprises using only integer operations to adjust the quantized weight values by the offset value and to multiply the adjusted quantized weight values with input values for the layer.

2. The computer-implemented method of claim 1 further comprising:
   computing an output for the layer of the neural network using the scaling factor for the layer, the offset value for the layer, the quantized weight values for the layer, and input values, wherein integer operations are used to adjust the quantized weight values by the offset value and to multiply the adjusted quantized weight values with the input values.

3. The computer-implemented method of claim 1 wherein the extreme weight value is the maximum weight value and an adjusted quantized weight value is obtained by subtracting a quantized weight value from the offset value using an integer operation.

4. The computer-implemented method of claim 1 wherein the extreme weight value is the minimum weight value and an adjusted quantized weight value is obtained by adding a quantized weight value to the offset value using an integer operation.

5. The computer-implemented method of claim 1 wherein the step of converting the quotient to an integer value comprises using rounding or truncation.

6. The computer-implemented method of claim 1 further comprising:
   using the method of claim 1 for each layer of two or more layers of the neural network.

7. The computer-implemented method of claim 6 wherein at least a plurality of the two or more layers are consecutive layers and the method further comprises:
   computing an output for the consecutive layers of the neural network by performing the steps comprising:
      using integer operations to:
         obtain, for each layer of the consecutive layers, a set of adjusted quantized weight values for the layer by adjusting the quantized weight values of the layer by the offset value of the layer; and
         multiply together the sets of adjusted quantized weight values and input values for the first layer of the consecutive layers to obtain an intermediate product; and
      multiplying together the scaling factors for each layer of the consecutive layers and the intermediate product to obtain the output for the consecutive layers.

8. A system comprising:
   one or more processors; and
   a non-transitory computer-readable medium or media comprising one or more sets of instructions which, when executed by at least one of the one or more processors, causes steps for asymmetric quantization of at least some weight values of a neural network to be performed comprising:
      identifying a set of extrema weight values from weight values for a layer of the neural network, the set of extrema weight values comprising a maximum weight value and a minimum weight value;
      obtaining a scaling factor for quantizing the weight values of the layer of the neural network using the set of extrema weight values and a number of bits that will be used to represent the weights values in quantized form;
      using one of the extrema weight values and the scaling factor to obtain an offset value for the layer by performing steps comprising:
         dividing the extreme weight value by the scaling factor to obtain a quotient; and
         converting the quotient to an integer value;
      using the scaling factor and the extreme weight value from the set of extrema weight values that was used to obtain the offset value to quantize the weight values for the layer; and
      for the layer, storing the scaling factor, the offset value, and the quantized weight values, to be used during inference, in which obtaining an output for the layer comprises using only integer operations to adjust the quantized weight values by the offset value and to multiply the adjusted quantized weight values with input values for the layer.

9. The system of claim 8 wherein the non-transitory computer-readable medium or media further comprises one or more sets of instructions which, when executed by at least one of the one or more processors, causes steps to be performed comprising:
computing an output for the layer of the neural network using the scaling factor for the layer, the offset value for the layer, the quantized weight values for the layer, and input values, wherein integer operations are used to adjust the quantized weight values by the offset value and to multiply the adjusted quantized weight values with the input values.

10. The system of claim 8 wherein the extreme weight value is the maximum weight value and an adjusted quantized weight value is obtained by subtracting a quantized weight value from the offset value using an integer operation.

11. The system of claim 8 wherein the extreme weight value is the minimum weight value and an adjusted quantized weight value is obtained by adding a quantized weight value to the offset value using an integer operation.

12. The system of claim 8 wherein the step of converting the quotient to an integer value comprises using rounding or truncation.

13. The system of claim 8 wherein the steps of claim 8 are applied for each layer of two or more layers of the neural network.

14. The system of claim 13 wherein at least a plurality of the two or more layers are consecutive layers and the non-transitory computer-readable medium or media further comprises one or more sets of instructions which, when executed by at least one of the one or more processors, causes steps to be performed comprising:
computing an output for the consecutive layers of the neural network by performing the steps comprising:
using integer operations to:
obtain, for each layer of the consecutive layers, a set of adjusted quantized weight values for the layer by adjusting the quantized weight values of the layer by the offset value of the layer; and
multiply together the sets of adjusted quantized weight values and input values for the first layer of the consecutive layers to obtain an intermediate product; and
multiplying together the scaling factors for each layer of the consecutive layers and the intermediate product to obtain the output for the consecutive layers.

15. A non-transitory computer-readable medium or media comprising one or more sequences of instructions which, when executed by one or more processors, causes steps for asymmetric quantization of at least some weight values of a neural network to be performed comprising:
identifying a set of extrema weight values from weight values for a layer of the neural network, the set of extrema weight values comprising a maximum weight value and a minimum weight value;
obtaining a scaling factor for quantizing the weight values of the layer of the neural network using the set of extrema weight values and a number of bits that will be used to represent the weights values in quantized form;
using one of the extrema weight values and the scaling factor to quantize the weight values for the layer of the neural network;
obtaining an offset value for the layer that is an integer value using the scaling factor and the extreme weight value from the set of extrema weight values that was used to quantize the weight values for the layer by performing steps comprising:
dividing the extreme weight value by the scaling factor to obtain a quotient; and
converting the quotient to the integer value; and
for the layer, storing the scaling factor, the offset value, and the quantized weight values, to be used during inference, in which obtaining an output for the layer comprises using only integer operations to adjust the quantized weight values by the offset value and to multiply the adjusted quantized weight values with input values for the layer.

16. The non-transitory computer-readable medium or media of claim 15 further comprising one or more sequences of instructions which, when executed by one or more processors, causes steps to be performed comprising:
computing an output for the layer of the neural network using the scaling factor for the layer, the offset value for the layer, the quantized weights for the layer, and input values, wherein integer operations are used to adjust the quantized weights by the offset value and to multiply the adjusted quantized weight values with the input values.

17. The non-transitory computer-readable medium or media of claim 15 wherein the extreme weight value is the maximum weight value and an adjusted quantized weight value is obtained by subtracting a quantized weight value from the offset value using an integer operation.

18. The non-transitory computer-readable medium or media of claim 15 wherein the extreme weight value is the minimum weight value and an adjusted quantized weight value is obtained by adding a quantized weight value to the offset value using an integer operation.

19. The non-transitory computer-readable medium or media of claim 15 wherein the step of converting the quotient to the integer value comprises using rounding or truncation.

20. The non-transitory computer-readable medium or media of claim 15 wherein the neural network comprise a set of consecutive layers and the non-transitory computer-readable medium or media further comprises one or more sets of instructions which, when executed by one or more processors, causes steps to be performed comprising:
computing an output for the set of consecutive layers of the neural network by performing the steps comprising:
using integer operations to:
obtain, for each layer of the set of consecutive layers, a set of adjusted quantized weight values for the layer by adjusting the quantized weight values of the layer by the offset value of the layer; and
multiply together the sets of adjusted quantized weight values and input values for the first layer of the set of consecutive layers to obtain an intermediate product; and
multiplying together the scaling factors for each layer of the set of consecutive layers and the intermediate product to obtain the output for the set of consecutive layers.

* * * * *